United States Patent
Eldada et al.

[11] Patent Number: 6,023,545
[45] Date of Patent: Feb. 8, 2000

[54] FABRICATION OF DIFRACTION GRATINGS FOR OPTICAL SIGNAL DEVICES AND OPTICAL SIGNAL DEVICES CONTAINING THE SAME

[75] Inventors: Louay Eldada, Randolph; Shing Yin, Union, both of N.J.

[73] Assignee: AlliedSignal Inc., Morris Township, N.J.

[21] Appl. No.: 09/026,764

[22] Filed: Feb. 20, 1998

[51] Int. Cl.[7] ................................................ G02B 6/34
[52] U.S. Cl. .................. 385/37; 385/4; 385/129; 385/10; 385/24; 385/43; 430/321; 359/566
[58] Field of Search ................... 385/37, 10, 4, 385/14, 24, 39, 41, 42, 129, 130, 131, 132, 147; 430/945, 290, 322, 321; 359/566

[56] References Cited

U.S. PATENT DOCUMENTS

| | | | |
|---|---|---|---|
| 5,101,297 | 3/1992 | Yoshida et al. | 385/4 X |
| 5,367,588 | 11/1994 | Hill et al. | 385/37 |
| 5,574,807 | 11/1996 | Snitzer | 385/24 |
| 5,716,762 | 2/1998 | Nishii et al. | 430/321 |

Primary Examiner—Phan T. H. Palmer
Attorney, Agent, or Firm—John A. Squires

[57] ABSTRACT

Method of fabricating a wavelength filter on a substrate in which a phase mask having corrugations is placed over a polymeric substrate composed of at least two comonomers having different indexes of refraction and passing light through the phase mask to form light into two beams corresponding to different diffraction orders to form refractive gratings capable of reflecting light of a selective wavelength. Optical signal devices employing gratings fabricated in this manner are also disclosed.

22 Claims, 3 Drawing Sheets

FABRICATION OF DIFRACTION GRATINGS FOR OPTICAL SIGNAL DEVICES AND OPTICAL SIGNAL DEVICES CONTAINING THE SAME

FIELD OF THE INVENTION

The present invention is generally directed to a method of fabricating diffraction gratings which are used to isolate a narrow band of wavelengths in an optical signal device such as a Mach Zehnder device or directional coupler. The fabrication method employs a phase mask having corrugations which periodically retard light passing therethrough onto a polymeric substrate comprised of comonomers having different indexes of refraction. The present method and optical signal devices produced therefrom result in less loss of light than typical optical signal devices.

BACKGROUND OF THE INVENTION

Optical signal devices are known for switching, add/dropping and routing of data. Devices for adding and dropping wavelength coded signals (light of a specific wavelength or wavelengths) are known in the art. Such devices employ optical fibers which are utilized predominantly in telecommunication systems in addition to local area networks, computer networks and the like. The optical fibers are capable of carrying large amounts of information and it is the purpose of such optical devices to extract a selected amount of information from the fiber by segregating the information carried on different wavelength channels.

Devices of this type are comprised of a variety of components which together provide the desired segregation of wavelength coded signals. Integrated optical couplers and especially directional couplers have been developed to accomplish evanescent directional coupling. Optical signals are coupled from one planar waveguide to another. The signals in the second planar waveguide propagate in the same direction in which the signals travel in the first planar waveguide.

Diffraction gratings (e.g. Bragg gratings) are used to isolate a narrow band of wavelengths. Such grating reflectors have made it possible to construct the device for use in adding or dropping a light signal at a predetermined centered wavelength to or from a fiber optic transmission system without disturbing other signals at other wavelengths.

Bragg grating systems for use in optical coupler devices are disclosed in the Elias Snitzer, U.S. Pat. No. 5,574,807, incorporated herein by reference. The '807 Patent discloses a device for use in adding or dropping light signals at predetermined centered wavelengths to or from a wavelength division multiplex fiber optic transmission system which carries signals at other wavelengths. A twin core fiber which is comprised of two, substantially identical, single mode fibers which form a coupling region are fabricated to provide substantially complete evanescent field coupling of light from one core to the other in a predetermined wavelength span. The twin core fiber also includes a Bragg grating system which is substantially perpendicular to the axis of the twin core fiber.

The devices disclosed in the prior art such as described above suffer from a number of disadvantages. One such disadvantage is that they are difficult to fabricate. A second disadvantage is that it is difficult to align Bragg gratings across the arms of the optical waveguides in the grating region.

It would therefore be a significant advance in the art of optical signal devices to provide a grating system which is relatively easy to fabricate and eliminates problems associated with aligning the grating to minimize the loss of light.

SUMMARY OF THE INVENTION

The present invention is generally directed to optical signal devices and especially optical signal devices which add and drop light signals. The present invention provides an improved grating system to make the dropping of light signals more efficient with less loss of light than current optical signal devices.

In particular, the present invention is directed in part to a method of fabricating a wavelength filter (e.g. a Bragg grating) on a substrate comprising:

a) placing a phase mask having corrugations on a polymeric substrate said substrate comprised of a polymer made up of at least two comonomers having different indexes of refraction.

b) passing a single beam of light through the phase mask to form two beams of light corresponding to different diffraction orders to form refractive gratings capable of reflecting light of a selected wavelength.

The present invention also encompasses optical signal devices with wavelength filters made in this manner.

BRIEF DESCRIPTION OF THE DRAWINGS

The following drawings are illustrative of embodiments of the invention and are not intended to limit the invention as encompassed by the claims forming part of the application.

DETAILED DESCRIPTION OF THE INVENTION

The present invention is directed to a method of fabricating a reflection grating system with enhanced contrast (i.e. larger index modulation) and more control over wavelengths of signals that are to be segregated from a multiple wavelength light source.

Gratings in optical signal devices are fine periodic refractive index variations which are used in numerous passive elements including couplers, deflectors, reflectors, wavelength filters and mode converters. Such devices have many applications but generally comprise a system for the control of optical wavelength signals.

In accordance with the present invention, a wavelength filter in the form of a grating system is provided on a polymeric substrate through a phase mask having a series of corrugations. A light beam is passed through the phase mask to form light in two beams corresponding to different diffraction orders to form refractive gratings capable of reflecting light of a selected wavelength.

Figure 1:
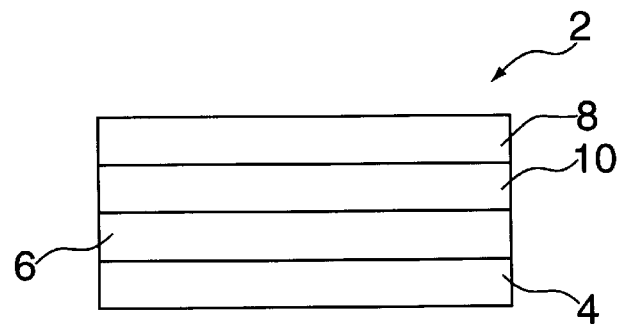
FIG. 1 is a side elevational view of an optical device of the present invention showing the relative positioning of the substrate, cladding layers and core layers.

The substrate employed for fabrication of the optical signal device of the present invention can be selected from a variety of materials including glass, silicon, plastics (e.g. polyurethane and polycarbonate) and the like. As shown in FIG. 1, the principle layers which comprise the optical signal device 2 include the substrate 4 as defined above having thereon an undercladding layer 6 and an overcladding layer 8. Sandwiched between the cladding layers 6 and 8 is a core layer 10 in which waveguides (not shown) are imprinted.

Figure 2:
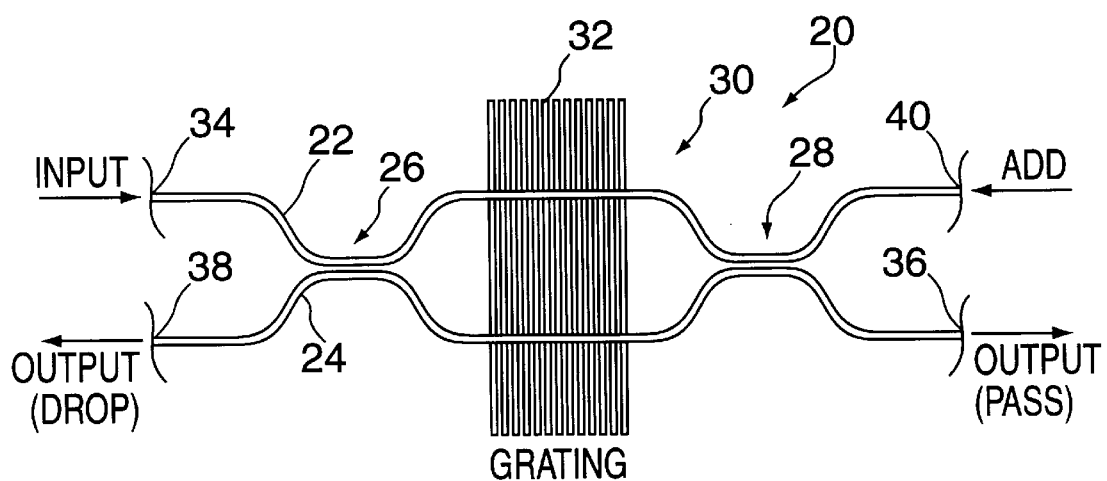
FIG. 2 is a schematic view of a first embodiment of the invention including a Mach Zehnder interferometer with waveguides positioned to enable evanescent coupling in the two 3-dB coupler regions of the device and a Bragg grating across the two spaced-apart arms in the middle of the device.

Referring to FIG. 2, there is shown, by way of example, a single channel add/drop optical signal in the form of a Mach-Zehnder device 20 which is formed on a substrate (see FIG. 1 for the relative position of the substrate). The device 20 shown in FIG. 2 in which evanescent coupling occurs in the coupling regions has two substantially identical planar waveguides 22, 24 which are aligned with each other in two 3-dB coupling regions 26, 28 in the form of directional couplers. Between the coupling regions 26 and 28 is a grating region 30 comprised of a grating system 32 (e.g. Bragg gratings), fabricated in accordance with the present invention.

The arrangements of the waveguides which are imprinted in the core layer 10 are devised to provide an optical signal device in which a single wavelength of light from a multiple wavelength light source is segregated and discharged from the optical signal device.

The undercladding layer 6, the overcladding layer 8 and the core layer 10 are preferably made from polymeric materials comprised of comonomers meeting certain requirements as described hereinafter. In particular, the comonomers are selected so as to have indexes of refraction which are different from each other so that the difference in the indexes of refraction (Δn) is sufficiently large to permit a large index difference between light and dark fringes in the interference pattern formed by light after it traverses a phase mask, since the relative amounts of the comonomers are different in areas that see light from areas that do not see light.

The comonomers preferably have different diffusion rates in that one of the monomers has a tendency to move away from the light fringes while the other of the monomers tends to stay in the light fringes. In addition, it is desirable that the comonomers which stay in the light fringes should have a rapid polymerization rate while those monomers which are not in the light fringes (dark regions) have a slower polymerization rate. The examples of various monomers and their conversion from the monomeric state to a polymer as a function of time are shown in FIG. 3.

Figure 3:
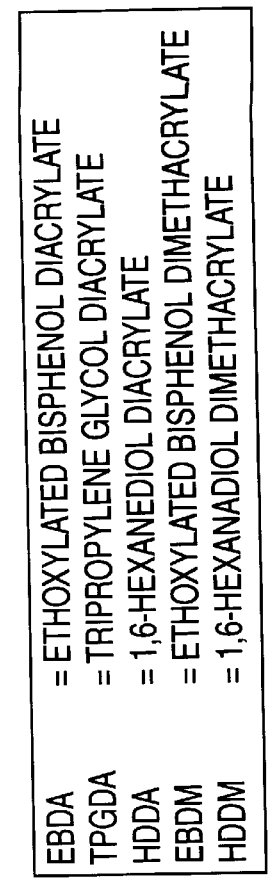
FIG. 3 is a graph showing the relationship between monomer conversion and time for a series of polymers useful for fabricating gratings in accordance with the present invention.
Figure 3:
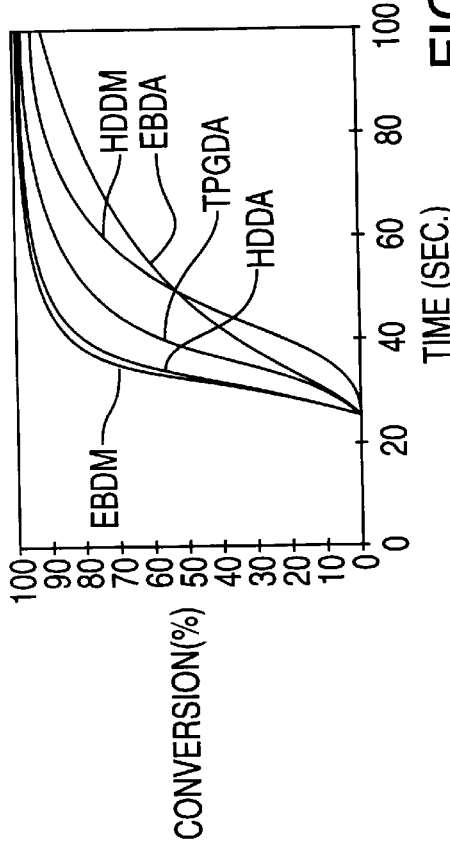

Referring to FIG. 3, it can be observed, for example, that HDDA monomer has a more rapid conversion rate than EBDA. This pair of monomers would be suitable for the formation of a polymeric material for use in the present invention. Conversely, the combination of EBDM and HDDA would not be as suitable because the polymerization rates for the respective monomers are similar. Polymers meeting the above-identified requirements are particularly suitable for receiving a wavelength filter or grating in accordance with the present invention.

The phase mask through which the light source passes into the polymeric material can be selected from a variety of materials including glass and quartz. The phase mask is required to have a series of corrugations so that a light beam passing therethrough will pass through both the phase mask material (e.g. glass) and air and thus become periodically retarded because light passes through the phase mask material at a slower rate than light goes through air. As a consequence, the light is diffracted and two beams of light corresponding to different diffraction orders exit the phase mask at different angles.

Figure 4:
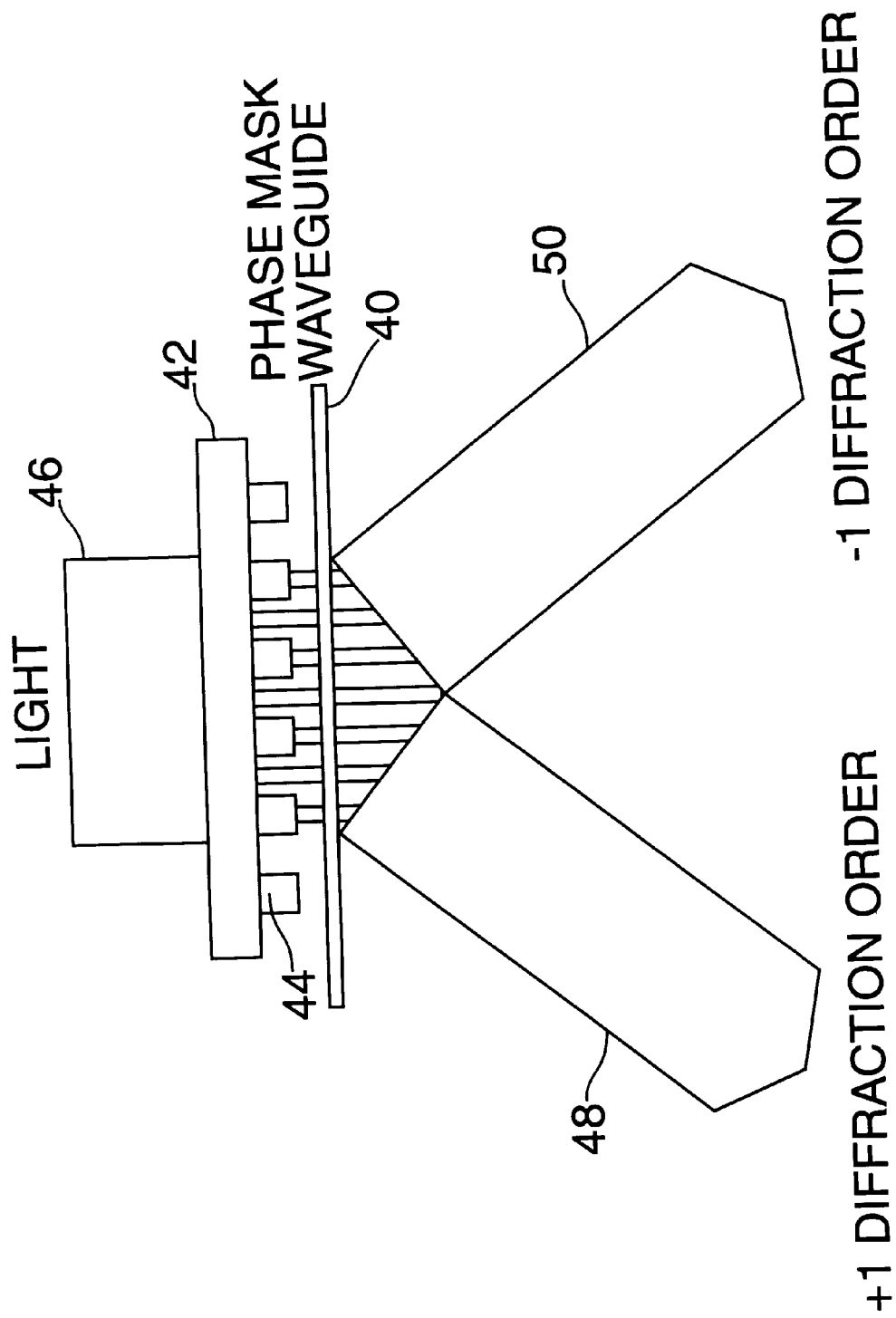
FIG. 4 is a schematic view showing the positioning of a phase mask above a substrate for creating gratings in an optical signal device in accordance with the present invention.

Referring to FIG. 4, there is shown a polymeric substrate 40 of the type described above having a phase mask 42 with a plurality of corrugations 44 therein. A light source designated by the numeral 46 and as hereinafter described sends a beam of light through the phase mask where diffraction of the light into two beams 48 and 50 takes place.

The two beams of light which exit the phase mask interfere with each other to form light and dark regions. The period of the light and dark regions is equal to ½ the period of the corrugations on the phase mask. Thus, for example, if the phase mask has a period of 1,040 nm, the two beams of light which exit the phase mask will form an interference pattern which has a period of 520 nm.

The wavelength of the light which is reflected in the grating system is determined in accordance with the following formula.

$$\lambda = 2 N_{eff} \Lambda$$

wherein $\lambda$ is the reflected wavelength, $N_{eff}$ is the effective index of refraction in the waveguide and $\Lambda$ is the period of the grating. Thus, for example, if the desired wavelength of the reflected light is 1,560 nm and the effective index of refraction in the waveguide is 1.5, then the period of the grating should be 520 nm.

In accordance with the present invention, the light source for producing a light beam which passes through the phase mask is a laser, preferably having a relatively small diameter laser beam, preferably from about 2 to 3 millimeters in diameter. A preferred laser beam for use in the present invention is an argon ion laser beam. The employment of the small beam provides better control over the placement of the gratings. The wavelength of the preferred argon ion laser beam is 350 to 365 nm.

Figure 5:
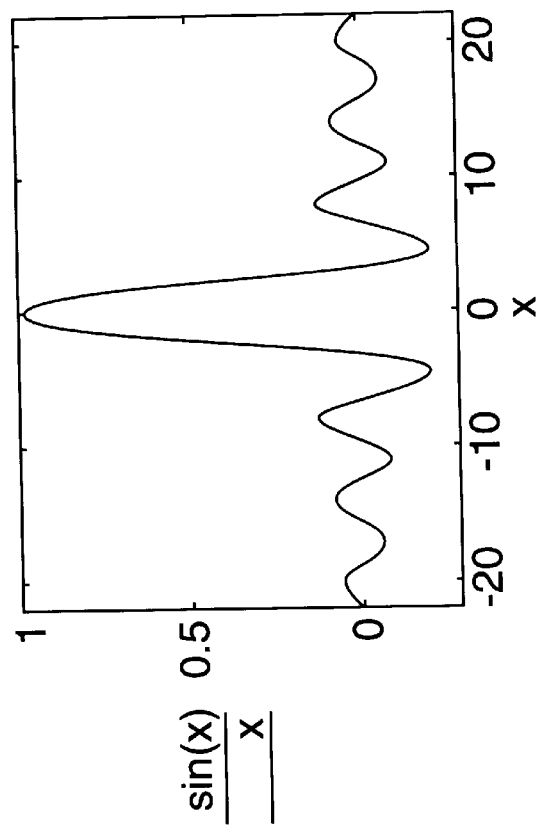
FIG. 5 is a graph showing a desirable wave function for the envelope of the refractive index modulation in the grating system of the present invention.

In accordance with a further aspect of the present invention, the speed at which the phase mask is scanned can be varied so that the amplitude of the grating can likewise be varied. It is desirable to have the difference in the index of refraction of the comonomers (Δn) stronger at the center than at the edges of the wave function in order to more accurately drop a desired predetermined wavelength by reducing the sidelobes around the main peak in the reflection spectrum. The presence of large sidelobes causes crosstalk interference between wavelength channels. Thus, the gratings of the present invention provide a large peak in the reflection spectrum at the desired wavelength and only small peaks on the sides. In a preferred form of the invention, it is desirable that the envelope of the refractive index modulation in the grating have a sinc profile wherein sinc (x)=[sin (x)]/x as indicated in FIG. 5. The resulting reflection spectrum has not only reduced sidelobes but also a rectangular or square shaped central peak which enables operational stability in the wavelength channel dropping efficiency despite slight fluctuations in the wavelength of the light generated by the communication system light source.

In accordance with another aspect of the present invention, apodization or any envelope can be obtained by varying the scanning speed of a small laser spot or by modulating the intensity of a large laser spot. Thus, by employing a small laser beam (2 to 3 mm) to scan across the phase mask by changing the speed, the local intensity of the grating can be varied which results in a first type of apodization. This results in a strong peak in the reflection spectrum at the desired wavelength and weaker peaks towards the sides of the main peak. By employing a sinc-shaped envelope for the grating as discussed above, the sidelobes can also be reduced thereby reducing crosstalk interference. A further benefit is that a square or rectangular shaped central peak is obtained in the reflection spectrum, which enables all light of the same or very similar wavelength to be dropped at a desired drop port.

In a further aspect of the invention, the grating is applied across both the cladding layers as well as the core layer. It is known that as much as 25% of the light which passes through the waveguides of known optical signal devices propagates in the cladding layers. The present invention provides for the reflection of light in the cladding areas and therefore a significant reduction in the loss of dropped light signals to levels well below 25%.

In a preferred form of the invention, the comonomers which are employed for the cladding layers as well as the core layer are not fully cured prior to the formation of the gratings through the use of a phase mask. By maintaining the comonomers in a semicured state, there remains some movement available to the comonomers so that upon treatment with the argon ion laser beam to provide the gratings, the comonomers can still move in response to the diffracted light from the laser beam. Subsequent to the fabrication of the gratings in accordance with the invention, full curing can commence through the use of UV light and the like. Full curing freezes the indexes of refraction of all materials in the waveguides and gratings.

In a further aspect of the invention, the gratings are provided in the optical signal device after the uppercladding layer has been placed over the core layer. It is known that polymerization is retarded by the presence of oxygen. By having the cladding layer over the core layer and then providing the grating system, the uppercladding layer acts as a barrier to oxygen penetration and therefore limits the availability of oxygen which would inhibit completion of the polymerization of the reaction when the grating system is installed. Thus, it is a preferred aspect of the invention if the grating system is applied through the uppercladding layer.

The employment of a polymeric system for the cladding and the core layers in accordance with the present invention provides a grating area having an average index of refraction which is essentially the same as areas outside the gratings (e.g. in the coupler region) of the optical signal device. Maintaining of the average index of refraction at substantially the same value prevents broadening on the blue side of the reflected peak when apodization is utilized.

EXAMPLE 1

A silicon wafer was used as a substrate. A negative-tone liquid photomonomer (from a mixture of 20.0 g ethoxylated bisphenol diacrylate, 10.0 g tripropylene glycol diacrylate, 0.6 g photoinitiator Irgacure 651, 0.09 g antioxidant Irganox 1010) was spin-coated so as to form a layer that was 10 μm thick and was subsequently uniformly UV-cured under a mercury lamp (Hg i-line, wavelength=365 nm) forming a solid thin film of refractive index 1.4895 (when fully cured) as an undercladding layer. The exposure time was kept short (1 sec.) at this point to obtain a layer that is only partially polymerized. A negative-tone liquid photomonomer (from a mixture of 20.0 g ethoxylated bisphenol diacrylate, 8.0 g tripropylene glycol diacrylate, 2.0 g 1,6-hexanediol diacrylate, 0.6 g photoinitiator Irgacure 651, and 0.09 g antioxidant Irganox 1010) was spin-coated onto the undercladding layer so as to form a layer that was 6 μm thick, was placed in contact with a mask where the waveguiding circuit (a cascaded 4-channel add/drop device where each of the four add/drop elements in the cascade was a Mach-Zehnder interferometer) was clear (the width of the waveguides in the mask was 6 μm), and that layer was subsequently selectively UV-cured through the mask under the mercury lamp (for a short time of 3 sec. to ensure only partial polymerization), solidifying the core waveguiding circuit which had a refractive index of 1.4970 (when fully cured). The mask was removed and the unexposed sections were developed away using methanol. The same photomonomer used for the undercladding was spin-coated onto the core structures so as to form a conformal layer that was 10 μm thick; that layer was subsequently blanket UV-exposed under the mercury lamp forming a solid conformal film of refractive Index 1.4895 (when fully cured) as an overcladding layer. This layer was also exposed for a short time (1 sec.) to ensure only partial polymerization at this stage. A phase mask with four gratings was used to print (using an Argon ion laser operating at 363.8 nm) a grating across the spaced-apart arms in each of the four Mach-Zehnder devices. The sample with the planar waveguiding circuit was held parallel to the phase masks at 50 μm from said mask. The laser beam was directed perpendicularly to the mask and the sample. The laser beam diameter was 3 mm (at $1/e^2$ intensity). The laser was scanned 3 mm across the center of the 6-mm-long Mach Zehnder arms, creating gratings in the three partially cured waveguide layers. The sample was finally subjected to a final UV cure in a nitrogen ambient under the mercury lamp (60 sec.) and a final thermal cure (90° C. for 1 h), resulting in full polymerization of all three layers. Testing of the sample revealed that all the gratings were reflecting the desired wavelength channels.

What is claimed:

1. An optical signal device comprising:
    a) a substrate including optical wave guides for propagating an optical signal, said substrate comprised of at least one polymer made up of at least two comonomers having different indexes of refraction; and
    b) a grating region traversing the substrate having one or a plurality of reflective gratings in which the average index of refraction of the grating region and the remaining portion of the substrate are about the same.

2. The optical signal device of claim 1 wherein the comonomers have different diffusion rates.

3. The optical signal device of claim 1 wherein the comonomers have different polymerization rates.

4. The optical signal device of claim 1 wherein the comonomers are selected from the group consisting of ethoxylated bisphenol diacrylate, tripropylene glycol diacrylate, 1,6-hexanediol diacrylate, ethoxylated bisphenol dimethacrylate and 1,6-hexanediol dimethacrylate.

5. The optical signal device of claim 1 wherein the difference between the indexes of refraction of the comonomers is stronger at the center than at the edges of the wave function.

6. The optical signal device of claim 1 wherein the gratings have a refractive index modulation having a sinc profile represented by the formula $\text{sinc}(x)=[\sin(x)/x]$.

7. A method of fabricating a wavelength filter on a substrate comprising:
    a) placing a phase mask having corrugations on a polymeric substrate, said substrate comprised of at least one polymer made up of at least two comonomers having different indexes of refraction; and b) passing light from a light source through the phase mask to form light into two beams corresponding to different diffraction orders to form refractive gratings on said substrate capable of reflecting light of a selective wavelength.

8. The method of claim 7 wherein the polymeric substrate comprises an overcladding layer, an undercladding layer and a core layer therebetween, said method comprising forming the refractive gratings on each of said layers.

9. The method of claim 8 comprising placing an overcladding layer over the core layer and then applying the refractive gratings to the substrate.

10. The method of claim 8 comprising partially curing the polymeric substrate, forming the refractive gratings on said layers and fully curing the polymeric substrate to thereby freeze all indexes of refraction.

11. The method of claim 7 wherein the light is an Argon ion laser beam.

12. The method of claim 11 wherein the wavelength of the Argon ion laser beam is from about 350 to 365 nm.

13. The method of claim 7 wherein the light passing through the phase mask has a diameter of from about 2 to 3 mm.

14. The method of claim 7 further comprising varying the scanning speed of the light source across the phase mask to thereby vary the amplitude of the refractive gratings formed on the substrate.

15. The method of claim 7 wherein the difference between the indexes of refraction of the comonomers is stronger at the center than at the edges of the wave function.

16. The method of claim 7 wherein the gratings have a refractive index modulation with an envelope having a sinc profile represented by the formula sinc(x)=[sin(x)/x].

17. The method of claim 1 wherein the difference in the indexes of refraction is sufficient to permit an index difference between light and dark fringes of the light which passes through the phase mask.

18. The method of claim 7 wherein the comonomers have different diffusion rates, said difference being sufficient so that one of the comonomers moves away from the light fringes of the light passing through the phase mask while another of the comonomers tends to stay in the light fringes.

19. The method of claim 7 wherein the comonomers have different polymerization rates.

20. The method of claim 7 wherein the comonomers are selected from the group consisting of ethoxylated bisphenol diacrylate, tripropylene glycol diacrylate, 1,6-hexanediol diacrylate, ethoxylated bisphenol dimethacrylate and 1,6-hexanediol dimethacrylate.

21. The method of claim 7 wherein the phase mask is made of a material selected from the group consisting of glass and quartz.

22. The method of claim 7 wherein the two beams of light which exit the phase mask interfere with each other to form light and dark fringes wherein the period is equal to one-half the period of the corrugations of the phase mask.

* * * * *